United States Patent
Williams (10) Patent No.: US 9,016,326 B2
(45) Date of Patent: Apr. 28, 2015

(54) THERMAL INSULATION OF FLEXIBLE PIPES

(75) Inventor: Peter Raoul Williams, Newcastle-Upon-Tyne (GB)

(73) Assignee: GE Oil & Gas UK Limited, Nailsea, Bristol (GB)

(*) Notice: Subject to any disclaimer, the term of this patent is extended or adjusted under 35 U.S.C. 154(b) by 1174 days.

(21) Appl. No.: 12/243,844

(22) Filed: Oct. 1, 2008

(65) Prior Publication Data

US 2009/0084459 A1  Apr. 2, 2009

(30) Foreign Application Priority Data

Oct. 2, 2007  (GB) .................................. 0719215.6

(51) Int. Cl.
*F16L 11/00* (2006.01)
*F16L 9/14* (2006.01)
*F16L 11/08* (2006.01)

(52) U.S. Cl.
CPC .................................. *F16L 11/083* (2013.01)

(58) Field of Classification Search
CPC ........... F16L 11/00; F16L 11/02; F16L 11/04; F16L 11/08; F16L 11/10; F16L 11/11; F16L 11/112; F16L 11/115; F16L 11/118; F16L 11/14; F16L 11/15; F16L 11/16; F16L 9/14

USPC ......... 138/133, 136, 137, 138, 139, 118, 129, 138/140, 143, 144, 149, 150

See application file for complete search history.

(56) References Cited

U.S. PATENT DOCUMENTS

| | | | |
|---|---|---|---|
| 3,948,295 A * | 4/1976 | Lemont et al. ................. | 138/147 |
| 4,972,759 A * | 11/1990 | Nelson .......................... | 122/494 |
| 5,488,975 A * | 2/1996 | Chiles et al. ................... | 138/125 |
| 5,830,548 A * | 11/1998 | Andersen et al. ............. | 428/36.4 |
| 6,615,876 B2 * | 9/2003 | Badders et al. ................ | 138/125 |
| 6,843,278 B2 * | 1/2005 | Espinasse ...................... | 138/134 |
| 7,124,780 B2 * | 10/2006 | Dupoiron ...................... | 138/134 |
| 2002/0185188 A1 * | 12/2002 | Quigley et al. ................ | 138/137 |
| 2004/0134556 A1 * | 7/2004 | Manini et al. ................. | 138/149 |
| 2005/0087250 A1 | 4/2005 | Ng et al. | |
| 2006/0249215 A1 * | 11/2006 | Bryant .......................... | 138/125 |
| 2009/0159144 A1 * | 6/2009 | Dixon-Roche ................ | 138/33 |

OTHER PUBLICATIONS

European Patent Office, European Search Report for European Application No. EP08164871.9-2424, Feb. 4, 2009, 6 pages.

* cited by examiner

*Primary Examiner* — Justin Jonaitis
(74) *Attorney, Agent, or Firm* — Klarquist Sparkman, LLP (57) ABSTRACT

A flexible pipe body and a method for manufacturing flexible pipe body is disclosed. The flexible pipe body includes an internal pressure sheath, at least one insulating layer comprising a mesh layer comprising a plurality of pockets and an outer sheath.

15 Claims, 6 Drawing Sheets

THERMAL INSULATION OF FLEXIBLE PIPES

CROSS REFERENCE TO RELATED APPLICATION

The present application claims priority to Great Britain Application No. GB0719215.6, filed Oct. 2, 2007, which is incorporated herein by reference.

FIELD

The present invention relates to flexible pipe body which can be used to form flexible pipe of the type suitable for transportation of mineral oil, crude oil or similar production fluids. In particular, but not exclusively, the present invention relates to flexible pipe body having a thermal insulation layer formed as a pocketed interstitial layer of the flexible pipe body.

BACKGROUND

Traditionally flexible pipe is utilized to transport production fluids, such as oil and/or gas and/or water, from one location to another. Flexible pipe is particularly useful in connecting a sub-sea location to a sea level location. Flexible pipe is generally formed as an assembly of a pipe body and one or more end fittings. The pipe body is typically formed as a composite of layered materials that form a fluid and pressure-containing conduit. The pipe structure allows large deflections without causing bending stresses that impair the pipe's functionality over its lifetime. The pipe body is generally, but not necessarily, built up as a composite structure including metallic and polymer layers.

In many known flexible pipe designs the pipe includes one or more tensile armour layers. The primary load on such a layer is tension. In high pressure applications, such as in deep water and ultra deep water environments, the tensile armour layer experiences high tension loads from the internal pressure end cap load as well as weight. This can cause failure in the flexible pipe since such conditions are experienced over prolonged periods of time.

Unbonded flexible pipe has been an enabler for deep water (less than 3,300 feet (1,005.84 meters)) and ultra deep water (greater than 3,300 feet) developments for over 15 years. The technology enabled the industry to initially produce in deep water in the early 90's and then to ultra deep waters up to around 6,500 feet (1,981.2 meters) in the late 90's. Water depths greater than 6,500 feet push the envelope where typical free-hanging riser configurations and flexible pipe in general can operate.

It is the increasing demand for oil which is causing exploration to occur at greater and greater depths where environmental factors are more extreme. In such deep and ultra-deep water environments ocean floor temperature increases the risk of production fluids cooling to a temperature which may lead to pipe blockage. For example, when transporting crude oil blockage of the internal bore of the flexible pipe can occur due to paraffin formation. As a method to overcome such problems it has, in the past, been suggested that a layer of thermal insulation should be provided around the barrier layer of a flexible pipe, the barrier layer being the layer forming the inner bore along which fluid is transported. The thermal insulation has been somewhat effective in insulating the inner bore of the pipe from external low temperature thus helping prevent blockage. Nevertheless, the insulation effects provided have been limited.

A further problem with known insulating techniques is that the formation of insulating layers can be a complex process which involves careful alignment, heating and cooling steps during manufacture. It will be appreciated that prior known insulating techniques have appreciably increased costs and time for manufacturing flexible pipe body.

It is an aim of the present technology to at least partly mitigate the above-mentioned problems.

It is an aim of embodiments of the present technology to provide flexible pipe body which can be used in flexible pipe of a type able to transport production fluids and which includes at least one thermal insulation layer between an internal pressure sheath, such as a barrier layer or liner, and outer shield layer of the flexible pipe body.

It is an aim of embodiments of the present technology to provide flexible pipe body which includes one or more insulating layers which are simple and quick to manufacture and yet which provide a highly effective thermal resistance to impede flow of heat energy in the radial direction across the flexible pipe body.

It is an aim of embodiments of the present technology to provide a riser assembly, jumper, flowline and/or method of manufacturing a flexible pipe able to operate in deep and ultra-deep water environments.

According to a first aspect of the present technology there is provided flexible pipe body for a flexible pipe, said pipe body comprising:
an internal pressure sheath;
at least one insulating layer comprising a mesh layer comprising a plurality of pockets; and
an outer sheath.

According to a second aspect of the present technology there is provided a method of manufacturing flexible pipe body, comprising the steps of:
providing a tubular internal pressure sheath;
forming an insulating layer comprising a mesh layer comprising a plurality of pockets over the internal pressure sheath; and
forming an outer sheath layer over the insulating layer.

According to a third aspect of the present technology there is provided a method of transporting a fluid comprising the steps of:
providing a flexible pipe comprising an internal pressure sheath, at least one insulating layer comprising a mesh layer comprising a plurality of pockets, and an outer sheath; and
transporting a fluid through the flexible pipe.

The flexible pipe can be used, for example, for the extraction, transport or refining of mineral oil, crude oil or related fluids, or the transport of cold fluids, such as ammonia.

Embodiments of the present technology provide flexible pipe body in which a thermal insulation layer is formed between a barrier layer or liner and an outer sheath. One or more such insulating layers may be formed each comprising a mesh layer comprising a plurality of pockets. The mesh layer may be a weave of woven filaments with holes between filaments forming the pockets or may be a sheet of material in which the pockets are formed by a plurality of through holes or blind holes.

Embodiments of the present technology provide an insulating layer having a number of pockets in which an insulating fluid such as air or gas or some other insulating material such as aerogel material can be located.

Embodiments of the present technology provide a co-axial pipe with at least one low conductivity insulating layer between an inner and outer layer of the pipe. The insulating layer which may be a weave or punched out sheet or other such structure serves as a means of increasing the thermal resistance of the pipe wall. The interstitially insulated pipeline will decrease the thermal loss of flowing fluid such as crude oil, delaying the onset of paraffin crystallisation and delaying or preventing the deposit of solid material on an interior surface of the pipe. As a result the need to 'pig' the pipeline may be delayed or eliminated.

BRIEF DESCRIPTION OF THE DRAWINGS

Embodiments of the present invention will now be described hereinafter, by way of example only, with reference to the accompanying drawings in which:

FIGS. 6a and 6b illustrate woven threads.
In the drawings like reference numerals refer to like parts.

DETAILED DESCRIPTION

Figure 1:
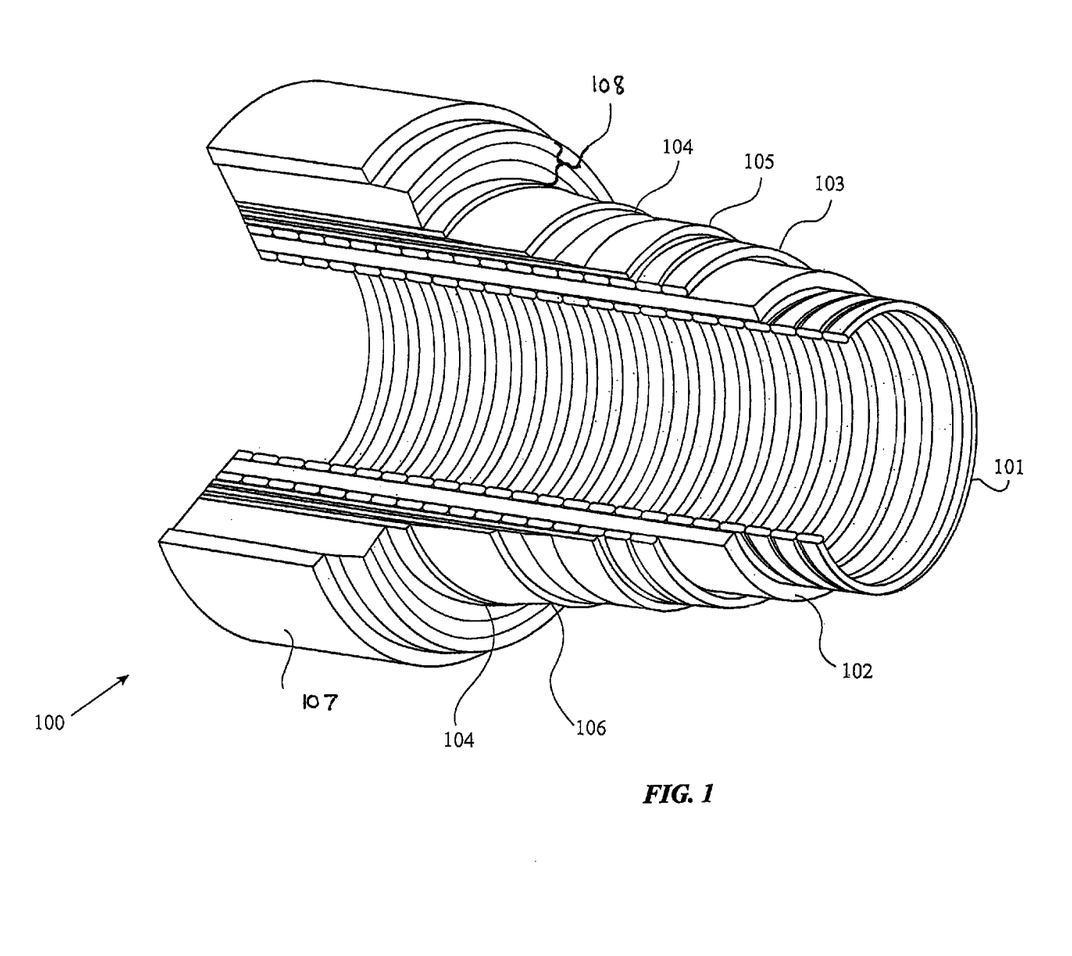
FIG. 1 illustrates a flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 100 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, a pipe body typically includes an innermost carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads. It will be appreciated that embodiments of the present invention are applicable to 'smooth bore' as well as such 'rough bore' applications.

The internal pressure sheath 102 acts as a fluid retaining layer and typically comprises a polymer layer that ensures internal-fluid integrity. It is to be understood that this layer may itself comprise a number of sub-layers. It will be appreciated that when the optional carcass layer is utilized the internal pressure sheath is often referred to as a barrier layer. In operation without such a carcass (so-called smooth-bore operation) the internal pressure sheath may be referred to as a liner.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes an outer sheath 107 which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting 109 located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
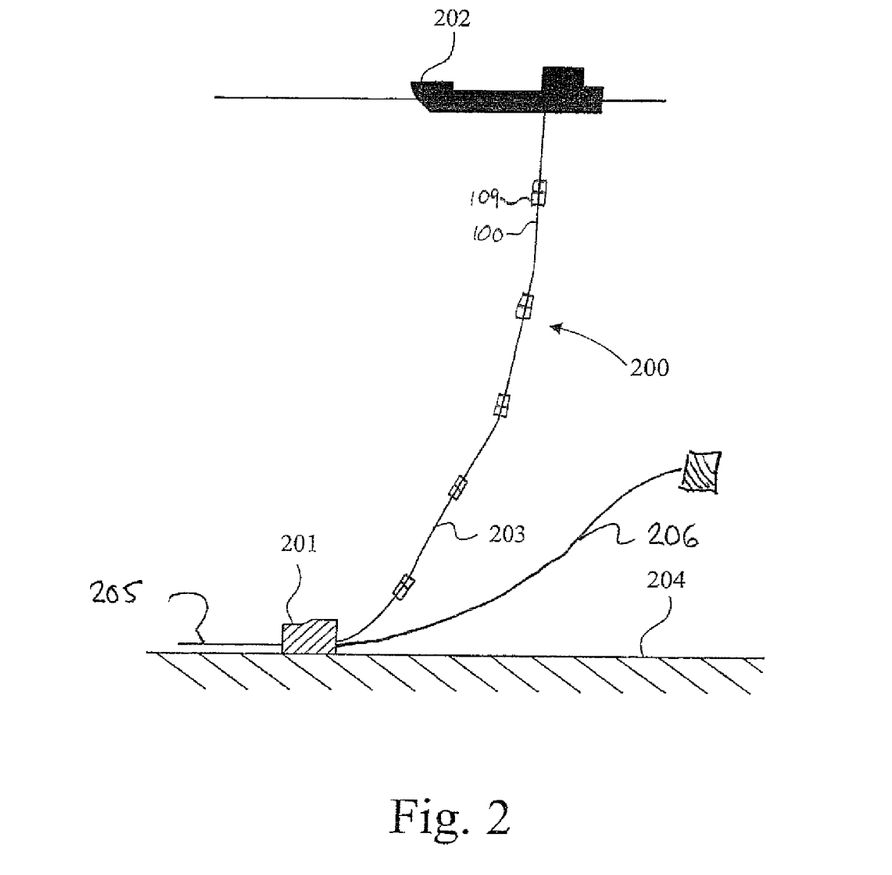
FIG. 2 illustrates a catenary riser, flowline and jumper.

FIG. 2 illustrates a riser assembly 200 suitable for transporting production fluid such as oil and/or gas and/or water from a sub-sea location 201 to a floating facility 202. For example, in FIG. 2 the sub-sea location 201 is a sub-sea flow line. The flexible flow line 203 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe body can be utilized as a flow line 205 or jumper 206.

Referring again to FIG. 1 an insulating layer 108 is provided under the outer sheath 107. As illustrated in FIG. 1 the insulating layer may itself be formed from multiple layers or, according to embodiments of the present invention, may be a single layer structure. The insulating layer 108 provides an interstitial layer in the coaxial pipe and increases the interstitial thermal resistance to heat flow radially outwardly across the pipe. Thermal energy leaving a transport fluid, running along the central bore, and entering the cold sub-sea environment is thus decreased. It will be appreciated that the flexible pipe body 100 may include one, two or more insulating layers located between selected layers of the multilayer flexible pipe body.

Figure 3:
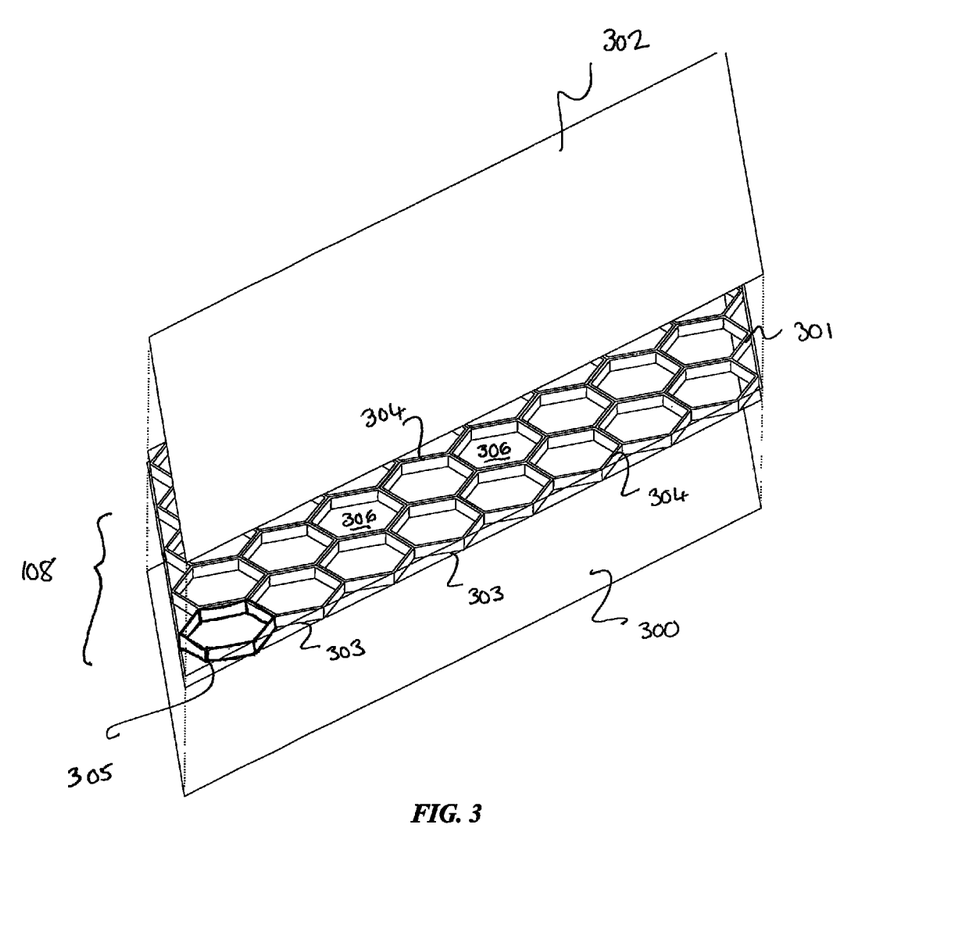
FIG. 3 illustrates an insulating layer.

FIG. 3 illustrates an example of an insulating layer 108 according to an embodiment of the present invention. The insulating layer includes an underlying extruded layer 300, a honeycombed metallic mesh layer 301 and an outer extruded layer 302. In forming the insulating layer 108 a radially inner extruded layer is formed during pipe manufacture and whilst this remains soft a preformed honeycombed mesh layer is formed about the inner extruded layer. The extruded layer will then solidify 'locking' the mesh layer and extruded layer together. The mesh layer 301 may be added in sheet form or aptly may be preformed as a tape which may be wound around the extruded layer. By virtue of the fact that the extruded layer is soft when the mesh layer is introduced radially inner edge regions 303 of the mesh layer will sink into the extruded layer. The mesh layer 301 and underlying extruded layer 300 thus become effectively an integral layer. A further outer extruded layer 302 is then extruded over the top of the mesh layer 301 effectively sandwiching the mesh layer in between the two extruded layers 300, 302. The outer extruded layer 302 is extruded in a manner so that the outer extruded layer is soft when it meets with the mesh layer. Radially outer edge regions 304 will thus become embedded in an underlying surface of the outer extruded layer 302 prior to setting of the outer extruded layer so that the underlying extruded layer 300, mesh layer 301 and outer extruded layer 302 effectively become one unitary insulating layer. A cross sectional contact area offered by the insulating layer or layer within the insulating layer is reduced with respect to that offered by adjacent layers.

The mesh layer 301 includes a multitude of hexagonal units 305 (one highlighted in FIG. 3) connected together. A central region 306 in each hexagonal unit defines a pocket in which air is trapped when the outer extruded layer 302 is extruded over the intermediate mesh layer 301 and lower extruded layer 300. This traps air or any other such fluid in each pocket 306.

Aptly, prior to extruding the outer layer 302 over the mesh layer a material having a particularly low thermal conductance U can be introduced into the pockets. The fluid may be air, an inert gas or aerogel material or the like. Such aerogel insulating products typically have thermal conductivities ranging from 0.009 to 0.022 w/mk.

Figures 4A, 4B:
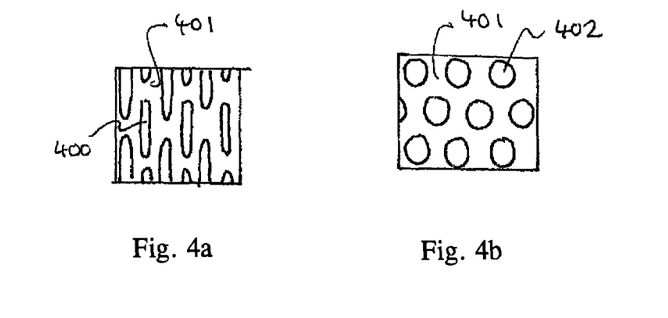
FIGS. 4a, 4b, 4c, and 4d illustrate holes in a web.
Figure 4C:
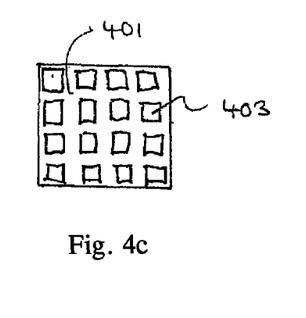

The mesh layer 301 is preformed with conventional techniques and may be manufactured from a wide variety of candidate materials such as stainless steel, titanium, constantin, monel, inconel alloy or incoloyl alloy or the like. Whilst FIG. 3 illustrates a honeycombed pattern, FIG. 4 illustrates how alternatively a wide variety of preformed metal layers or expanded metal layers may be utilized. FIG. 4a illustrates how a slotted hole configuration can be utilized with elongate slots 400 being preformed in a metallic body 401. FIG. 4b illustrates how round holes 402 may be formed and FIG. 4c illustrates how square holes may be formed. It will be appreciated that embodiments of the present invention are not restricted to any specific preformed shape.

Figure 4D:
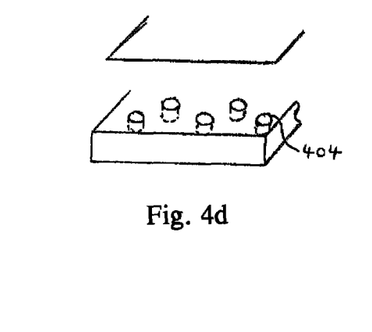

In generating the mesh layer 301 a sheet of metal is perforated to produce the pocket regions illustrated in FIGS. 3 and 4. It will be appreciated that rather than perforating a metal sheet with through holes, blind holes 404 (FIG. 4d) may alternatively be formed. Likewise rather than utilizing a perforated sheet or sheet including blind holes, an expanded metal webbing of material having, for example a flattened, standard or decorative structure may be utilized. It will be appreciated that if blind holes are formed then one of the inner or outer extruded layers 300, 302 may be omitted since the mesh layer itself will include the necessary structure to close an open side of each pocket.

Figure 5:
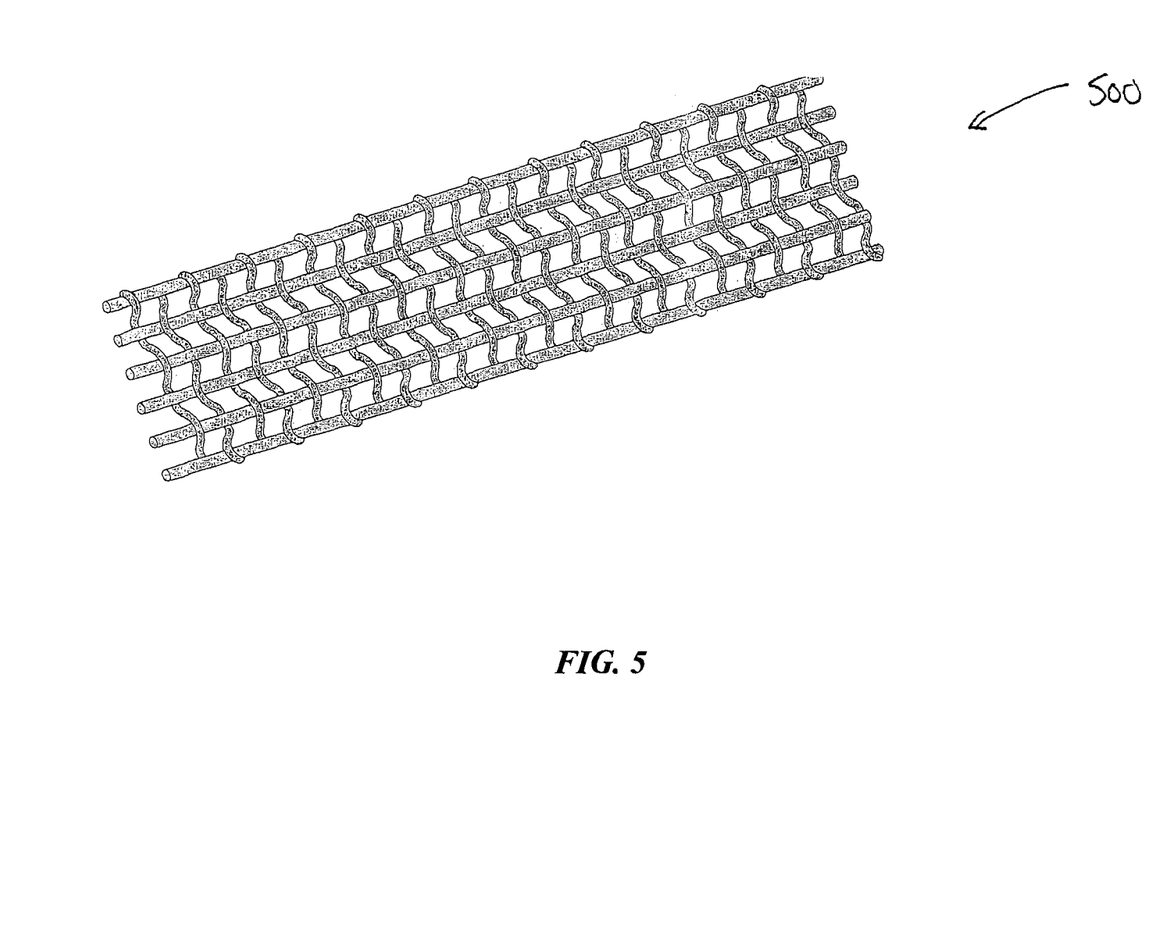
FIG. 5 illustrates a weave.
Figure 6A:
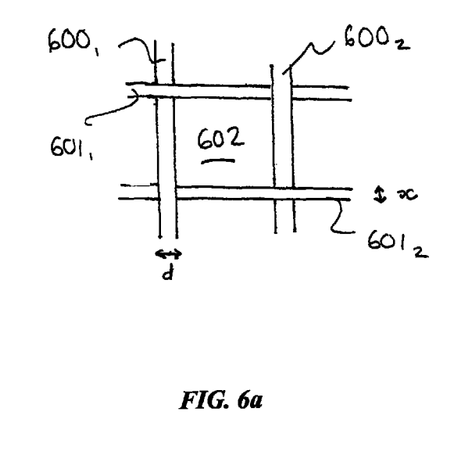
Figure 6B:
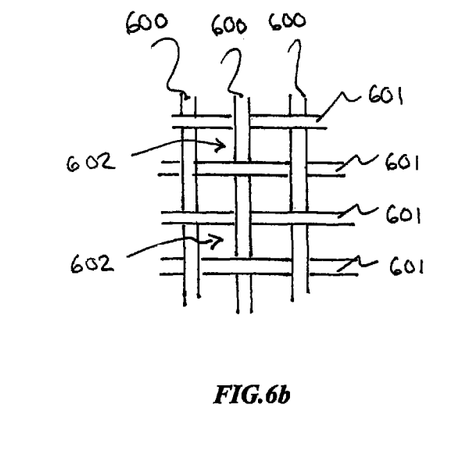

FIG. 5 illustrates how a woven layer 500 may be utilized as a mesh layer to form an insulating layer in the flexible pipe body 100 according to alternative embodiments of the present invention. The woven mesh layer 500 shown in FIG. 5 is illustrated as a plain weave shown more clearly in FIGS. 6a and 6b in which the thermal resistance offered by the mesh layer can, in many respects, be determined by controlling the geometric-physical parameters of the weave during manufacture. As illustrated in FIG. 6a, each weave has warp threads $600_1$, $600_2$ and weft threads $601_1$, $601_2$. The thickness d of the warp threads 600 may be greater than, lesser than or equal to the thickness x of the weft threads 601. Open spaces 602 are formed between woven threads which form the pockets for the mesh layer in use.

As per the material of the perforated or expanded mesh layer noted above with respect to FIGS. 3 and 4 the threads of the weave 500 may be formed from any material having a sufficiently low thermal conductivity value k so that the insulating layer 108 offers thermal resistance in the flexible pipe body 100. Suitable material for the threads is thus a metal layer such as titanium, uranium, constantan, inconel, monel, stainless steel or nickel chromium or the like. Also instead of a metal weave, threads may be manufactured from other types of material such as plastics materials like a polymer resistant to the compressive loads in the operational environment. A nylon like PA11 or PA12 or the like may aptly be utilized.

It will be appreciated that whilst embodiments of the present invention have been described hereinabove with respect to an insulating layer 108 formed from an intermediate mesh layer and outer extruded layers, embodiments of the present invention can make use merely of a mesh layer located between other layers of flexible pipe body. That is to say omitting the above-described extruded layers. In such cases a mesh layer of woven material or fully or partially perforated sheet or expanded metal or plastic sheet is wrapped as sheets or as a preformed tape around an underlying layer of the flexible pipe body with the overlying layer of flexible pipe body being formed thereover. This outer layer formation traps air or other insulating fluid in pockets formed by the mesh layer.

Aptly a mesh layer as above-described may be formed over a layer of flexible pipe body and a metal tape layer wound over the mesh layer. This helps spread load in the flexible pipe body and avoids creep. A high thermal resistance gel layer such as aerogel can optionally then be formed on an outer surface of the wound tape layer with a further layer of the flexible pipe body being formed over the gel layer. In this embodiment extruded layers like those noted above are also optional.

It will be appreciated that whilst embodiments of the present invention have been described with respect to usage of a metallic mesh layer, embodiments of the present invention can use a plastics or other non-metallic type material for the mesh layer. Aptly the weave/mesh is not compressible so that adjacent layers touch.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. Flexible pipe body for a flexible pipe for transporting production fluids such as oil, gas and water from a sub-sea location, said pipe body comprising:
    an internal pressure sheath constructed to withstand deep water environments;
    at least one insulating layer comprising a mesh layer comprising a plurality of pockets;
    an outer sheath constructed to withstand deep water environments; and an insulating aerogel material disposed in a plurality of said pockets, wherein the insulating aerogel material has a thermal conductivity of 0.009 to 0.022 w/mk, and wherein the at least one insulating layer is provided between the internal pressure sheath and the outer sheath;

wherein the pipe body is configured for sub-sea use for transporting production fluids from a sub-sea location and constructed to withstand operating conditions in deep water environments.

2. The flexible pipe body as claimed in claim 1, further comprising:
said mesh layer comprises woven filaments, a plurality of holes between the filaments defining respective locations of said pockets.

3. The flexible pipe body as claimed in claim 2, wherein said filaments comprise metal wires.

4. The flexible pipe body as claimed in claim 1, wherein said mesh layer comprises a web layer comprising a plurality of blind or through holes preformed in the web.

5. The flexible pipe body as claimed in claim 4, wherein the holes are preformed in a predetermined pattern.

6. The flexible pipe body as claimed in claim 4, wherein said web is a metal sheet.

7. The flexible pipe body as claimed in claim 1, wherein said insulating layer comprises a mesh tape helically wrapped over the internal pressure sheath.

8. The flexible pipe body as claimed in claim 7 wherein said tape is wrapped directly onto an outer surface of at least one intermediate layer located radially between the internal pressure sheath and the outer sheath.

9. The flexible pipe body as claimed in claim 1, wherein said insulating layer further comprises an inner extruded layer and an outer extruded layer, said mesh layer being disposed between the inner and outer extruded layers.

10. The flexible pipe body as claimed in claim 9, further comprising:
a metal layer between said mesh layer and the inner and/or outer extruded layer.

11. The flexible pipe body as claimed in claim 10, wherein said metal layer comprises a thin layer of metal tape helically wrapped around the internal pressure sheath.

12. The flexible pipe body as claimed in claim 1, wherein the internal pressure sheath comprises a barrier layer or liner.

13. A flexible pipe comprising the flexible pipe body as claimed in claim 1, further comprising:
two end fittings each located at a respective one of two ends of the pipe body wherein said insulating layer comprises a continuous layer extending between the end fittings.

14. A riser, flowline or jumper comprising the flexible pipe as claimed in claim 13.

15. A method of transporting a production fluid such as oil, gas and water from a sub-sea location comprising:
providing a flexible pipe comprising an internal pressure sheath constructed to withstand deep water environments, at least one insulating layer comprising a mesh layer comprising a plurality of pockets, an outer sheath constructed to withstand deep water environments and an insulating aerogel material disposed in a plurality of said pockets, wherein the insulating aerogel material has a thermal conductivity of 0.009 to 0.022 w/mk and wherein the at least one insulating layer is provided between the internal pressure sheath and the outer sheath and wherein said mesh layer comprises a web layer comprising a plurality of blind or through holes preformed in the web;
placing the flexible pipe in a sub-sea location; and
transporting a fluid through the flexible pipe.

* * * * *